C. W. WALLER.
MEANS FOR ELECTRICALLY PROPELLING AND COMMUNICATING WITH AERIAL
VEHICLES AND MARINE VESSELS.
APPLICATION FILED DEC. 14, 1918.
1,421,326.
Patented June 27, 1922.
4 SHEETS—SHEET 1.
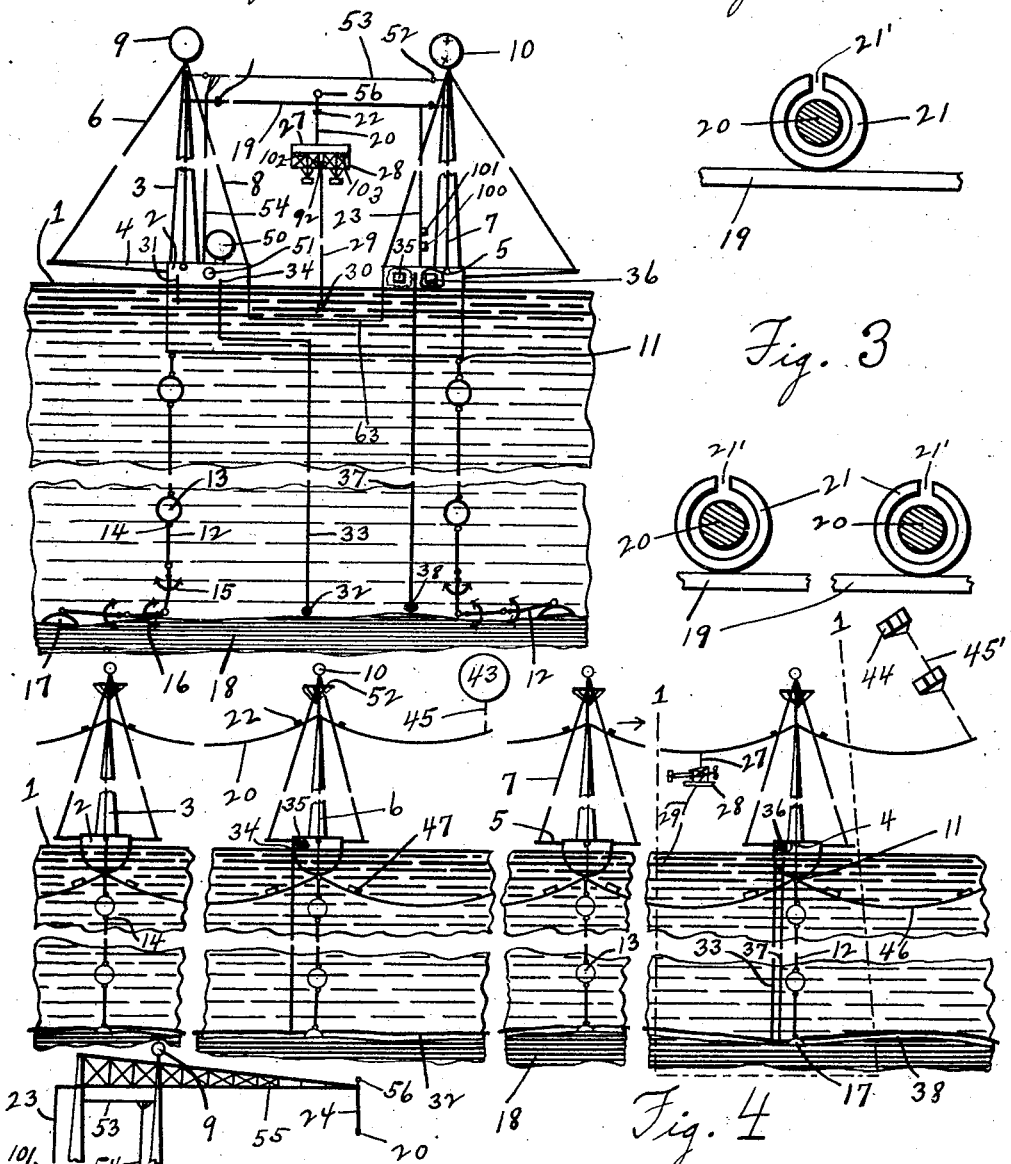
Charles W. Waller INVENTOR.

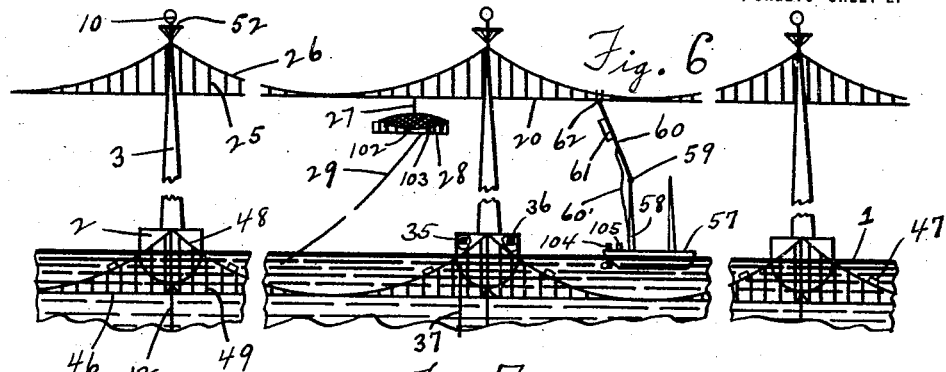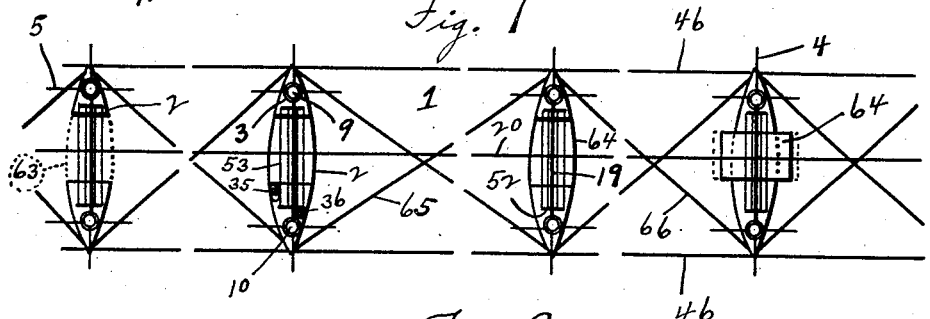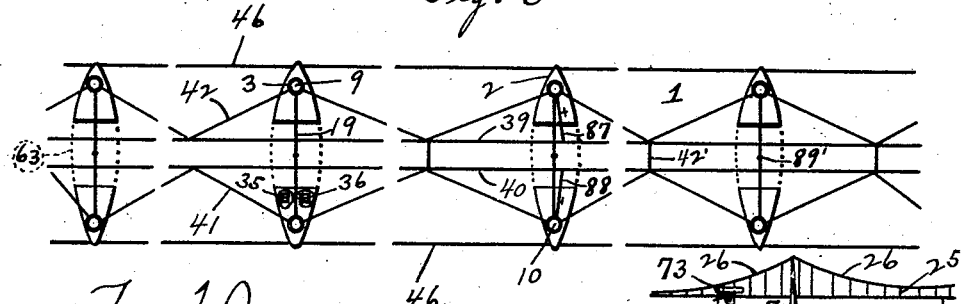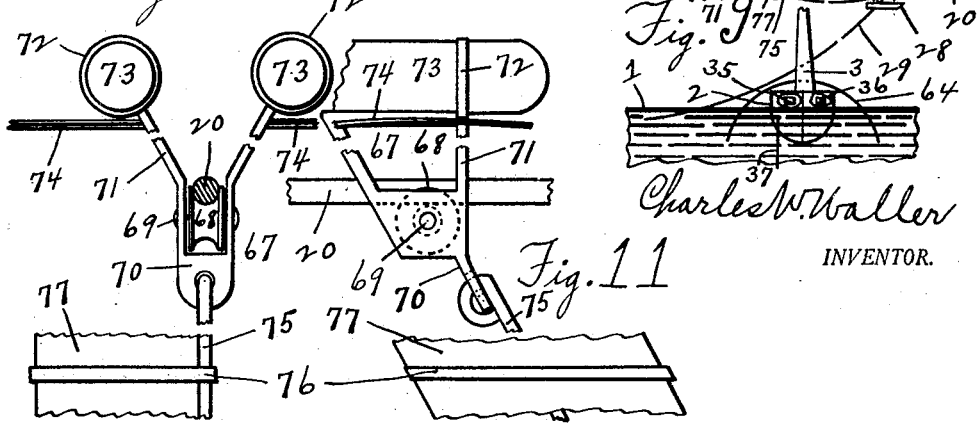

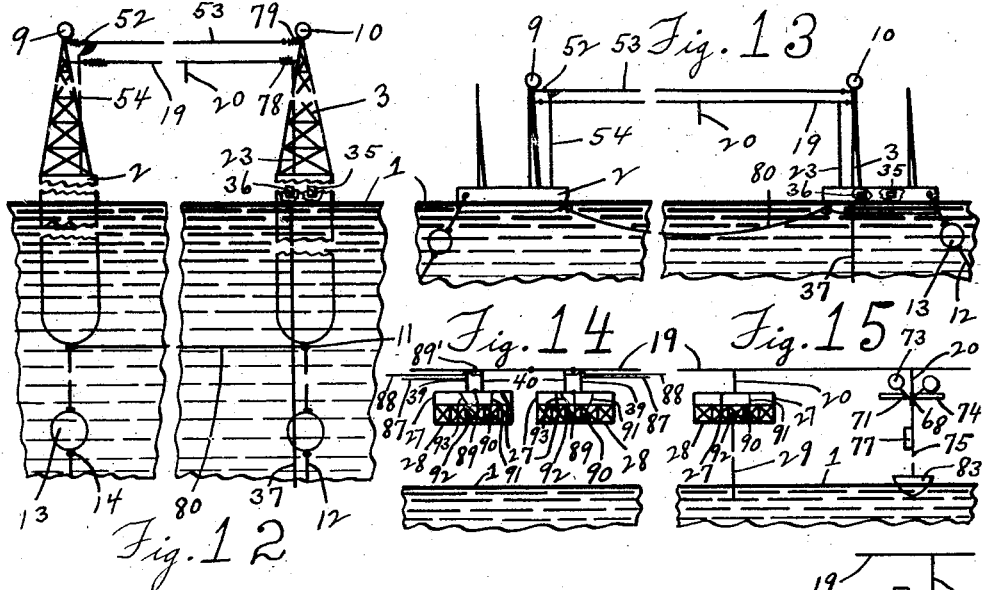
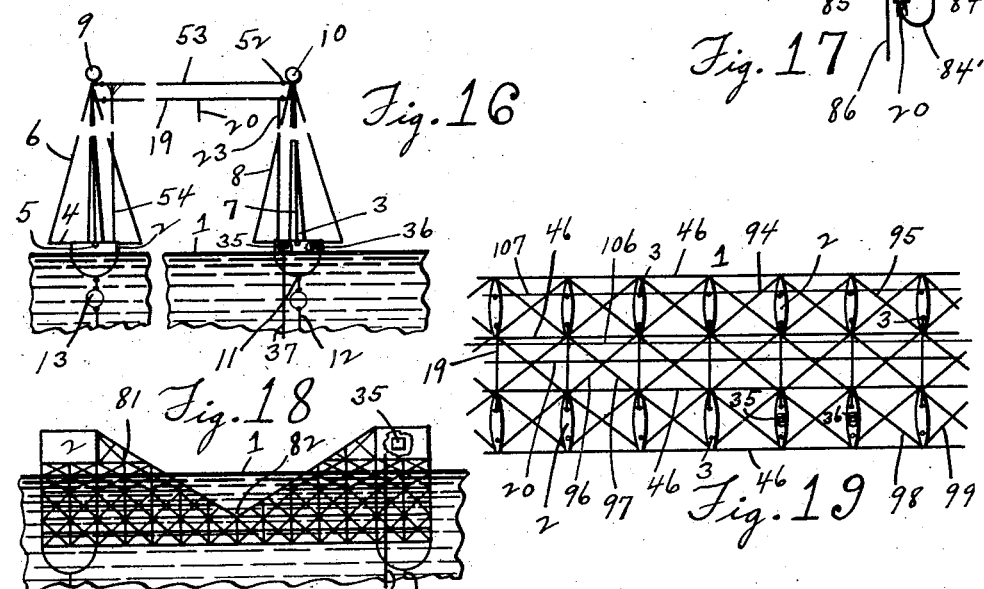
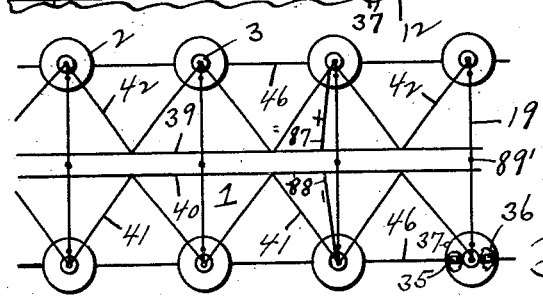

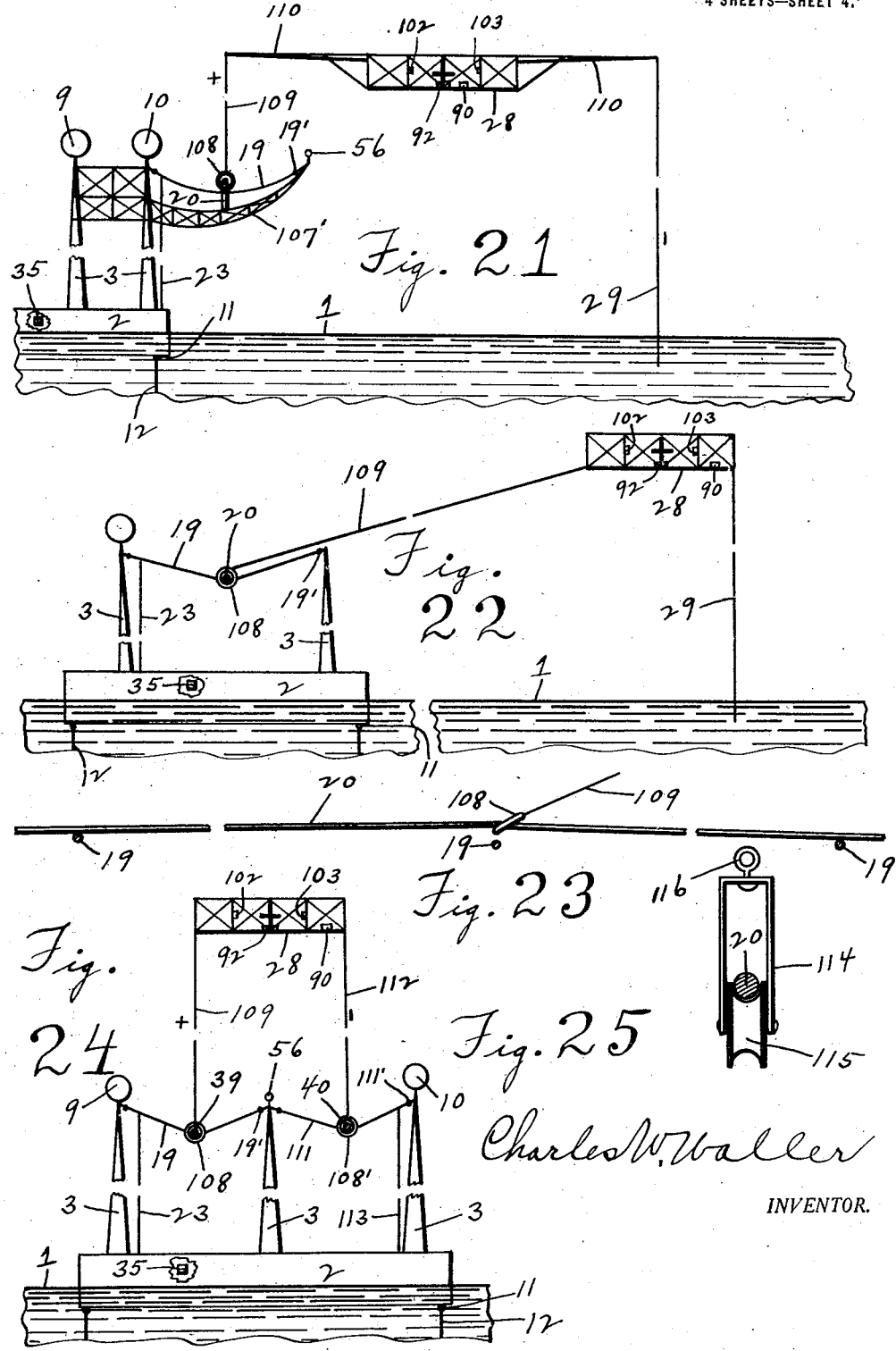

UNITED STATES PATENT OFFICE.

CHARLES W. WALLER, OF CHICAGO, ILLINOIS.

MEANS FOR ELECTRICALLY PROPELLING AND COMMUNICATING WITH AERIAL VEHICLES AND MARINE VESSELS.

1,421,326.         Specification of Letters Patent.      Patented June 27, 1922.

Application filed December 14, 1918. Serial No. 266,831.

*To all whom it may concern:*

Be it known that I, CHARLES W. WALLER, a citizen of the United States, residing at Chicago, in the county of Cook and State of Illinois, have invented certain new and useful Improvements in Means for Electrically Propelling and Communicating with Aerial Vehicles and Marine Vessels, of which the following is a specification.

My invention relates to the propulsion of and communication with aerial vehicles and marine vessels, and the primary object thereof is to improve the method of propelling aerial vehicles and marine vessels over a body of water by means of electricity and the establishment of a line of floats, buoys or hulls across a body of water, such as, for instance, across an ocean or lake, or up or down the length of a river, thereby eliminating the necessity for aerial vehicles and marine vessels carrying a large quantity of fuel, thereby greatly increasing the freight, mail and passenger carrying capacity of said aerial vehicles and marine vessels.

Another object is to provide means for either telephonic or telegraphic wire-communication between aerial vehicles or marine vessels and the shore, or between flying machines, or between marine vessels, or between said aerial vehicles and marine vessels; all while said aerial vehicles and vessels are in motion or not, and to relay wireless messages across or over a body of water.

A further object of the invention is to make possible flying or sailing over a body of water without the necessity of a mariner or the use of a compass, by laying off or out a marked course or aerial route to follow over said body of water, such as the trackless course of the ocean, by means of a line of floats or hulls stationed a suitable distance apart to mark the way.

A still further object is to provide means for supplying electricity to aerial vehicles and marine vessels and for wire means for private, secret or direct communication over or across a body of water.

With the above mentioned and other ends in view, the invention consists in the novel construction, arrangement, and combination of parts, hereinafter described, illustrated in some of its embodiments in the accompanying drawings, and more fully pointed out in the appended claims.

Referring to the drawings, forming a part of this specification,

Figure 1, is an end elevation of my invention, on line 1—1 of Fig. 4, looking in the direction of the arrow, but not showing the means for connecting said floats, with one another.

Fig. 2, an end view of the slidable wire-securing means, showing the wire in section.

Fig. 3, an end view of the same in plural form and showing the plural wires in section.

Fig. 4, a side elevation with only the bell suction anchors for the floats shown.

Fig. 5, an end view, showing a modified form of wire-supporting means, which permits the aerial vehicle to fly at either a low or high altitude.

Fig. 6, a side elevation of a modified form of means for suspending the wire.

Fig. 7, a top plan view showing the means of connecting the floats, and also showing that said floats may have a portion of or their entire decks above or below the surface of the water, and also showing that some or all of said floats may be provided with a shield, and provided with a single electric or trolley wire.

Fig. 8, a top plan view of the invention provided with plural electric wires, and also showing a portion of the decks of all the floats below the surface of the water.

Fig. 9, a side elevation showing the use of shields on the floats that have their decks above the water, and also showing the aerial vehicle provided with a modified form of trolley or current contacting means and aeroplane supporting surfaces on said contacting means.

Fig. 10, an end elevation of said trolley or current contacting means and said aeroplane supporting surfaces showing portions of the same removed.

Fig. 11, a side elevation of the same, and also showing portions of the same contacting means and aeroplane supporting surfaces removed.

Fig. 12, an end elevation of a modified form of the invention.

Fig. 13, an end elevation showing the floats in the form of oppositely disposed ships or vessels.

Fig. 14, an end elevation showing plural sets of positive and negative electric wires used.

Fig. 15, an end elevation showing how aerial vehicle and also a vessel or ship are propelled electrically, by making electric contact with an electric wire and also showing the current contacting means provided with aeroplane supporting surfaces.

Fig. 16, an end elevation of a modification of the form shown in Fig. 12.

Fig. 17, an end elevation of a modified form of trolley-wire suspending means.

Fig. 18, an end elevation of a modified means of connecting the floats shown in Figs. 12, 13, 16, 19 and 20.

Fig. 19, a top plan view of oppositely disposed ships or vessels employed as floats.

Fig. 20, a top plan view of oppositely disposed floats supporting plural electric wires.

Figs. 21 and 22, end elevations of modified forms of means for supporting the longitudinally extending wire and modified current contacting means therefor.

Fig. 23, a side view of said longitudinally extending wire and said modified current contacting means.

Fig. 24, an end elevation of modified means of supporting plural or positive and negative longitudinally extending wires and positive and negative contacting means or trolleys for said wires.

Fig. 25, an end elevation of a modified form of current contacting means or trolley.

Similar numerals of reference designate like parts throughout all the figures of the drawings.

The numeral 1 designates a body of water, in which a plurality of floats 2 are suitably spaced, preferably broadside toward broadside and arranged to bridge said body of water by forming a longitudinally extending line across the said body of water, such as for instance, to bridge the ocean. The said floats being employed either singly as shown in Fig. 1, or, if desired, being employed plurally as shown in Fig. 12.

The floats 2 may be of any suitable type or construction, such as, for instance, buoys, hulls, pneumatic tanks or cylinders, rafts, ferry-boats, barges, boats, ships, or any type of vessel, such as obsolete war, merchant, or passenger ships, cutters, ore freighters, (which latter are especially adapted for the forms shown in Figs. 1 and 9, since the masts and chimneys are located at the ends of the same), schooners, (owing to their number and disposition of masts are especially adapted for the form shown in Fig. 14,) and tankers, or ships otherwise useless as navigating vessels, in which case the smoke stacks could be shortened or eliminated, or, if desired, floats of other special design may be employed.

Each of the floats 2 is provided with a transverse support or wire 19 for the support and electrical charging of a longitudinally extending wire 20, such as a trolley wire, being extended between means for supporting said transverse support, such as the masts 3 of said floats or ships, etc., or, if desired, a section of or a complete floating dry dock being fitted with means 3 or masts, and the said floats being, if desired, of a submersible or non-sinkable type, and may be of wood, steel or concrete construction.

The said means or masts 3 may be braced by means of arms 4 and 5 and guy wires 6 and 7, respectively, and inner guy wires 8, the means or masts 3 being of any suitable type or design, such as the common solid wood or hollow steel type of mast shown in Figs. 1, 4, 5, 6, 7, 8, 9, 13, 16, 19 and 20, but may, if desired, be in the form of towers of open lattice-work, such as are fitted to American navy vessels, shown in Fig. 12, and may be of wood, steel or any other suitable material, and the masts 3 may be fitted with suitable extension means, such as, for instance, extension masts, not shown.

As a means to guide an aerial vehicle or marine ship at night, one or both of the masts 3 are provided with any suitable form of lights 9, such as, for instance, coston lights, or magnesium flares, or may be fitted with acetylene gas or light-house lights, and thus the floats 2 would serve as aerial and marine light-ships and life-saving stations across the entire body of water, such as an ocean.

All or some of the other masts 3 may be provided with identification or distinguishing marks 10 as a guide to said aerial vehicles and marine vessels, either in the daytime or at night.

As a means of keeping each of the floats 2 in its designated latitude and longitude or proper location and position, suitable securing means 11 are attached to suitable anchoring or flexible means 12, such as cables, chains or ropes, and in order to reduce the downward pull, due to the weight of the means 12, suitable hollow or solid submerged buoyant means 13, such as buoys or floats are attached to said anchoring means, by means of securing or fastening means 14.

As a means of securing said floats, the lower end of the means 12 are fastened to anchoring or securing means, such as auxiliary plural anchors 15 and 16, and bell suction anchors 17. If, for any reason, the anchor 15 should be pulled loose from the floor or bottom 18 of a body of water, as shown in Fig. 1, the secured anchors 16 would still function to hold said floats, and if they too should be unloosened, the anchor 17 would still hold, or, if desired, a quantity of stone, concrete or scrap-iron or other suitable weights could be sunk to the bottom of said body of water after the securing means 12 has first been attached thereto, with or without the above mentioned anchors, as desired.

As before mentioned, the transverse supports or wires 19 are each extended between the means or masts 3 in order to support or sustain a longitudinally extending electric wire 20, such as a trolley wire and may be fastened securely or may be slidably fastened by means of slidable securing means 21, such as rings, (preferably open at their tops), in which case the wire 20 is provided with checking means or projections 22 fore and aft of the rings 21, in order to prevent said wire 20 from pulling over excessively to one side or the other of the floats 2, the transverse supports or wires 19 being insulated from the masts 3 by suitable insulations 19′.

In case the wire 20 is to be fed with electrical current from some or all of the floats 2, a feed wire 23 connects the wire 20 with any suitable electrical source 35, such as, for instance, generators, (either direct or alternating current) storage batteries, etc., on said floats.

The wire 20, may also, if desired, be hung or suspended from single hangers 24, or if desired to eliminate sagging in the wire 20, the said wire may be hung from catenary or plural hangers 25, which extend downwardly from a main suspending or messenger wire or cable 26.

The aerial vehicles 28, of any suitable type, (of either a lighter or heavier than air vehicle) are provided with any suitable electric-current contacting or collecting means 27, such as either common or pantograph trolleys, by which means electric current is supplied to suitable electric propulsive means or motors 92, or for other electrical purposes or equipment. If the dirigible balloon type of machine is employed, the same is preferably inflated with any suitable non-inflammable or non-explosive gas, such as, for instance, helium gas.

Owing to the salinity of certain bodies of water, such as, for instance, the Atlantic Ocean and as a means of cheaply and efficiently returning the current to its source, electrolysis may be employed, in which a suitable negative electric trailing wire 29 leads from and is towed by each of said aerial vehicles, the lower end of said wire being in effect an electrode and being in contact with and travels through the surface of said body of water or electrolyte a suitable distance and depth, and if desired, a trailing weight or device 30 may be attached to the end of said wire.

As a means of returning the negative current from the aerial vehicles and marine vessels to its source in one or more of the floats 2 or the shore, the said floats are provided with a ground or return means 31 (Fig. 1) such as a wire.

In order to supply the wire 20 with current from either the shore or one or more of the floats 2 by means of a submarine feed cable or wire 32, branch feed wires 33 extend from the cable or wire 32 and enter the floats 2 at any suitable point such as at 34 and if a high voltage or tension current is employed, connects with a transformer 36, such as a step-down transformer, it being understood that if desired, said feed cable 32 may connect with any suitable electrical source on shore, not shown.

If desired, one or more return electrical connections or negative electric current wires 37 and a cable 38 may be employed for returning the current to its source at either the shore or one or more of the floats 2, or, if desired, the negative wire 37 may be entirely eliminated and all or a portion of the cable 38 be bare to receive the negative currents through the water from the surface by electrolysis, or the said negative current may be relayed from float to float and finally to its source on either one of said floats or on shore by electrolysis.

If it should be desired to employ plural trolley wires as shown in Figs. 8, 14 and 20, the floats 2 support a positive electric wire 39 and a negative electric wire 40, in which case the trailing wire 29 may be entirely eliminated, but in which case also, trolley wire separating means or wires 41, 42 and 42′ are preferably employed to prevent the wires 39 and 40 from touching and to keep the same in a more steady position.

As a means of assisting the floats 2 to sustain the trolley wire 20 or wires 39 and 40 or to take up sag in these wires, suitable aerial sustained wire suspending means or devices may be employed, such as balloons 43 (either spherical or kite balloons) or kites 44 (such as, man-lifting kites) or stationary or hovering flying machines, not shown, (such as shown by my Patent No. 1,132,049, issued March 16, 1915) which are connected to the wire 20 or wires 39 and 40, as the case may be, by connecting means or members 45 and 45′, respectively, the said means or devices being disposed either between the floats 2 or directly above them, as desired.

As a means of keeping the floats 2 in proper position relative to each other and also to assist the anchoring means 12, flexible means 46 are employed therefor, such as ropes, wires, chains or cables, which extend longitudinally from end to end of each of said floats, and if desired, in order to assist in bearing the weight of said means 46, said means may be provided with buoyant means 47, such as buoys or floats. If desired, the weight of said means 46 may be sustained by suspending means or members 48 and plural catenary hangers or members 49.

As a means of protecting and guiding flyers and marine ships, and of laying off and marking the aerial route at night, vertical or slanting beams of various colors and motions of light may be employed to form aerial and marine lightships by means of suitable lights 50, such as, for instance, search-lights.

For obvious reasons, a window 51 may be provided in the floats 2.

As a means of the floats 2 communicating by wireless with each other, or with aerial vehicles or marine vessels, while in motion or at rest, or to relay wireless messages across the body of water upon which the floats 2 rest, insulating cross pieces or bars 52 are provided, between which extend aerial wires 53, to which is connected a connecting wire 54 which in turn connects with wireless instruments on the floats 2.

In the modified means of supporting the trolley wire 20, shown in Fig. 5, 55 denotes a horizontal bracket or frame which extends outwardly from the float 2 at the end of which the trolley wire 20 is suspended by means of the single hanger 24, (or if desired, catenary hangers similar to that shown in Fig. 6, may be employed) and above which at the end of each of said brackets is a light, identification or distinguishing mark 56. This modified form permits the flying machine or airship to fly at a greater height, or not to be so limited in the height of flight as the forms shown in Figs. 1 to 20, when the current contacting means or device 67 is employed, as the electric following member 75 could then clear the outer end of said frame 55.

As a means of electrically propelling a marine vessel or ship 57, which vessel is provided with any suitable electric propulsive means, not shown, one of the masts 58 is provided with a joint or hinge 59 to which is attached an upwardly extending electric connecting member or arm 60, and hanging down from said arm is a member or rope 60′ by means of which the means or device 62 may be made to make or break electrical contact with the wire 20.

As a means of holding the said arm in an upwardly extending position, the same is provided with suitable means therefor, such as a gas container 61, or a spring, not shown, may be provided also or instead.

In order for the vessel or ship 57 to collect electric current from the wire 20, said arm is provided at its upper end with a suitable electric current contacting or collecting means 62, which in the present instance, is fork shaped, but may also be of any other suitable form or type.

To allow the passage of either the marine vessel 57 or the wire 29 through the center portion of the floats 2, the depressed portion 63 of said floats is submerged below the surface of the water, as shown in Figs. 1, 4, 6, 7 and 8.

As a means of assiting the wire 29 to pass over floats of the single or ship type, the decks of said floats or ships are covered, preferably at their center portion, with shields 64, as shown in Figs. 7 and 9.

If desired to assist the means 46 in connecting the floats 2 to each other and to further assist in maintaining said floats in their proper positions, diagonally disposed flexible members 65 and 66, such as ropes, wires, cables or chains are provided, which may, if desired, also be provided with buoyant means, not shown, similar to 47 in Fig. 6.

The modified form of current contacting or collecting means 67 shown in Figs. 9, 10, 11 and 15, is provided with one or more trolleys 68 which revolves on a spindle 69 in a harp 70 and frame 71, said frame, if desired, preferably terminating in one or more rings or bands 72 which preferably encircle one or more gas containers 73, said containers being preferably inflated with helium gas for other non-inflammable or non-explosive gas, and which containers exert an upward pressure on the trolley 68 against the trolley-wire 20 to make proper electrical contact and to also support the weight of the means 67 as a whole. The said trolley harp 70 being provided with the spring (not shown) commonly in use in street railway trolleys which presses against the side of the trolley or wheel to maintain good electrical contact between the same and electric wire which passes down with the following member 75.

The modified form of current contacting means 67 makes it possible, due to the gas container or containers 73, for the aerial vehicle or marine vessel, as the case may be, to come to a full stop on the body of water and to break electrical contact between said means 67 and the wire 20 by pulling the means 67 down out of the way, thus permitting other aerial vehicles or marine vesels to pass and to cause said means 67 to be again elevated or lifted back by its own buoyancy, to the overhead wire 20 to make electrical contact when said vehicle or vessel is ready to again proceed.

In addition, aerial sustaining or supporting means for the means 67 may be provided to function while said last means is being towed through the air by either an aerial vehicle or marine vessel, in the form of aeroplane supporting surfaces or planes 74, which preferably extend outwardly from each side of the frame 71, shown in Figs. 9, 10, 11 and 15.

As a means of connecting the means 67 to either aerial vehicle as shown in Fig. 9, or to a marine vessel 83 as shown in Fig. 15, the following member 75 preferably, has attached thereto rings or bands 76 encircling a gas container 77, said gas container functioning to sustain or support a portion or all of the weight of said following member.

As a means of returning the electric current to its source from the vessels 57 or 83, any suitable electrode (not shown) may be exposed by said vessels and in contact with the body of water 1, thereby employing electrolysis as grounding means for said electric current through said body of water.

In the form of the invention shown in Fig. 12, means 78 and 79 are provided such as, for instance, spiral springs, to prevent the transverse support 19 and aerial wires 53, respectively, from breaking under strains as when the top ends of the masts 3 tend to move outwardly or away from each other, as may be the case in a high or choppy sea. In this figure the floats 2 are shown in the form of vertical cylinders and in the form shown in Fig. 13, the same are shown in the form of ships, which cylinders and ships are prevented from separating beyond a certain degree by means of a transverse member 80, such as a rope, cable, chain or wire, whereas it is entirely eliminated near the surface of the water in the form shown in Fig. 16, but, may, if desired, be extended from one to the other of the means 12 a certain distance below the surface, in this form.

The floats 2 in Figs. 12, 13, 16, 19 and 20 may, if desired, be connected laterally by means of a frame or framework 81, preferably provided with a depressed or open central portion 82, in which case the member 80 may be entirely eliminated.

In the modified form of trolley and trolley-wire suspending means shown in Fig. 17, 84 is a hanger extending downwardly from the transverse support 19, said hanger having a curve 84' at its lower portion, the end of which extends upwardly and connects with and supports the trolley wire 20, over which a trolley 85 is moved or drawn by means of a downwardly extending arm 86, to which is attached the following member 75.

In the form shown in Figs. 8, 14 and 20, in which plural trolley-wires are employed and in which the trailing wire 29 may be entirely eliminated, positive and negative electric feed wires 87 and 88 connect with the positive and negative trolley wires 39 and 40, respectively, in which case the current or collecting means 27 on the aerial vehicles 28 is provided with an insulation 89, and the wires or supports 19 with insulations 89', for obvious reasons.

In the form shown in Figs. 8, 14 and 20, if desired, the aerial vehicles 28 may be provided with transformers 90, such as step-down transformers, which are connected to suitable electric propulsive means, such as for instance one or more electric motors by means of suitably affixed positive or lead electrical connections 91. The said propulsive means, motor or motors also being connected to the contacting means 27 by means of suitable negative or return electric connections 93.

In the form shown in Figs. 13 and 19, the floats or ships 2 are assisted in keeping or holding their proper places relative to each other by means of diagonally disposed following means 94 and 95, 96 and 97, and 98 and 99, and the means 12, extending outwardly and downwardly, as shown in Fig. 13, if desired.

As a means of telephonic and telegraphic wire communication between the floats 2, or between the floats 2 and aerial vehicles 28, or between the vessels 57 and 83, or between the said aerial vehicles and marine vessels, the said floats, flying machines, airships and marine vessels are each provided with electric wire communication means, such as, wire telephones 100, 102 and 104, respectively, and wire telegraph instruments 101, 103 and 105, respectively, 106 denoting a telephone wire, and 107 a telegraph wire, said wires 106 and 107 being used in addition to the wire 20 as a means of communication between the floats 2 and also between said floats and the shore.

If desired, the wire 20 may be laid loosely upon and to make electrical contact with the transverse support or wire 19, or, the openings 21' (Figs. 2 and 3) in the top of the rings 21 may be widened or opened fully. In either case, the transverse support or wire 19 being supported by means of an upwardly extending arm or frame 107' (Fig. 21) or between the masts 3 as shown in Fig. 22, a ring or other suitable current contacting or collecting means 108 preferably encircling said wire 20, said means being adapted to pass the supports or wires 19 and to slide along and make frictional contact with the wire 20 or be towed by the aerial vehicle 28 by means of a trailing positive electric wire 109 which extends upwardly and connects with the electric propulsive means, motor or motors in said aerial vehicle, the negative electric trailing wire 29 being towed as previously mentioned.

If desired to trail or tow the wire 109 directly above the wire 20, and to more separate the distance between the wires 109 and 29, the aerial vehicle 28 may be provided with outwardly or laterally extending arms 110 as shown in Fig. 21, but if it is desired to have the wire 109 extend laterally between the wire 20 and aerial vehicle 28, the arms 110 may be entirely eliminated, as shown in Fig. 22.

The current contacting or collecting means 108 and the wire 109, in approaching one of the wires or supports 19, in flight, would raise the wire 20 slightly, as shown in Fig. 23, thus permitting the means or ring 108 to pass each of the wires 19, after which the wire 20 would again lower itself to rest upon the wire 19 which was past last. However, I wish it understood that any other form or type of current contacting or collecting means may be employed which is adapted to pass the wires or supports 19.

If desired to eliminate the use of electrolysis in returning the negative electric current to its source, the positive wire 39 and negative wire 40 may also be laid to rest upon the wire or support 19 and 111, respectively, and the positive wire 109 and the negative wire 112 (Fig. 24) being provided with contacting means or rings 108 and 108', respectively, or other suitable contacting means, the wire 40 taking up the negative current from the means or ring 108' on the wire 112, while the negative transverse wire or support 111 leads the current to the wire 113, which in turn leads to the electrical source 35, as shown in Fig. 24, the wire 111 being provided with suitable insulations 111'.

As a means to prevent the wires 109 and 112 from making electrical contact with the wires 40 and 39, respectively, when the aerial vehicle 28 makes a landing, the wires 109 and 112 are preferably insulated.

In order to employ a trolley instead of the rings 108 or 108', if desired, the form of trolley shown in Fig. 25, may be provided in which 114 is the frame in which a wheel 115 revolves, the wire 20 being disposed within said frame. A swivel eyelet 116 may also be provided, if desired, to which may be attached the wire 109, one of said eyelets may be attached to the end of each of said wires 109 and 112, as the case may be.

I wish to have it understood, that, if desired, the invention may be made to function without the use of the floats 2, as when the aerial vehicle or marine vessel is to travel up or down the coast of a body of water or a longitudinally extending stream, such as a river, in which case, the trolley wire may be supported by suitable means on shore and the trailing wire trailing in the water, similar to when the floats are employed.

From the foregoing description, taken in connection with the accompanying drawings, the operation and advantages of my invention will be readily understood.

Having thus described some of the embodiments of my invention, what I claim and desire to secure by Letters Patent is,—

1. In means for electrically propelling aerial vehicles, a plurality of floats supporting a trolley wire, an aerial vehicle provided with electric propulsive means and electric current contacting means, and an electric wire trailing in a body of water.

2. In means for supplying electricity to marine vessels, a plurality of floats on a body of water, said floats provided with a trolley wire, a vessel provided with electric current contacting means, and said vessel and contacting means connected with an electric following member provided with one or more gas containers.

3. In means for electrically propelling marine vessels, a plurality of floats on a body of water, said floats provided with a trolley wire, a vessel provided with an electric motor, electric current collecting means, and said vessel and electric current collecting means being connected with an electric following member provided with a gas container.

4. In means for electrically propelling marine vessels, a plurality of floats on a body of water, said floats provided with means for supporting a trolley wire, a vessel provided with an electric motor and electric current collecting means, and said current collecting means provided with a gas container.

5. In means for supplying electricity to marine vessels, a plurality of floats on a body of water, said floats provided with means for supporting a trolley wire, a vessel provided with electric contacting means, and said contacting means provided with one or more gas containers.

6. In means for electrically propelling aerial vehicles, a plurality of floats provided with means for supporting a trolley wire, an aerial vehicle provided with an electric motor and electric current collecting means provided with a gas container.

7. In means for supplying electricity to aerial vehicles, a plurality of floats, said floats provided with means for supporting a trolley wire, an aerial vehicle provided with electric current contacting means, and said contacting means provided with one or more gas containers.

8. In means for electrically propelling aerial vehicles, a plurality of floats provided with a trolley wire, an aerial vehicle provided with an electric motor and electric current collecting means, and said aerial vehicle and current collecting means being connected by means of an electric following member provided with a gas container.

9. In means for supplying electricity to aerial vehicles, a plurality of floats arranged in a longitudinal line, said floats provided with a longitudinally extending electric wire, and flexible means extending longitudinally from end to end of each of said floats.

10. In means for electrically propelling aerial vehicles, a plurality of longitudinally arranged lines of floats, said floats provided with longitudinally extending electric wires, and diagonally disposed flexible means connecting said floats with one another.

11. In means for supplying electricity to aerial vehicles, a plurality of floats provided with a trolley wire, an aerial vehicle provided with electric current contacting means, and said aerial vehicle and contacting means being connected by means of an electric following member provided with a gas container.

12. In combination, a plurality of floats arranged in a longitudinal line, said floats provided with a longitudinally extending electric wire, and diagonally disposed and lateral longitudinally extending flexible means connecting said floats with one another.

13. In means for electrically propelling aerial vehicles over a body of water, a plurality of floats provided with a trolley wire, an aerial vehicle provided with an electric motor and electric current collecting means, and electrical connections between some or all of said floats and an electric submarine cable.

14. In means for electrically propelling marine vessels, a plurality of floats provided with a trolley wire, a marine vessel provided with electric propulsive means, electric current contacting means, and electrical connections between some or all of said floats and an electric submarine cable.

15. A plurality of floats provided with a longitudinally extending wire, and a shield extending over the side or sides of said floats.

16. Means for supplying electricity to aerial vehicles, comprising a trolley wire, current contacting means provided with a gas container, and means connecting said contacting means with an aerial vehicle.

17. Means for supplying electricity to aerial vehicles, comprising a trolley wire, current contacting means provided with a gas container, means connecting said contacting means with an aerial vehicle, and a trailing wire extending from and towed by said aerial vehicle.

18. Means for supplying electricity to aerial vehicles, comprising a trolley wire, current contacting means provided with a gas container, means connecting said contacting means with an aerial vehicle, and a trailing wire extending from and towed by said aerial vehicle and trailing in a body of water.

19. Means for supplying electricity to aerial vehicles, comprising a trolley wire and electric current contacting means provided with one or more aeroplane supporting surfaces.

20. In means for supplying aerial vehicles with electricity, a plurality of floats on a body of water, supporting means for a longitudinally extending wire, said wire laid loosely upon said supporting means, an aerial vehicle provided with a trailing electric wire which connects slidably with said longitudinally extending wire, said aerial vehicle provided with electric propulsive means, and a trailing electric wire in contact with a body of water.

21. In means for supplying electricity to aerial vehicles, a plurality of floats on a body of water, said floats provided with a trolley wire, an aerial vehicle provided with electric current contacting means, and an electric wire trailing in said body of water.

22. A plurality of floats provided with supporting means for a longitudinally extending wire, said wire laid loosely upon said supporting means, an aerial vehicle provided with a trailing electric wire which connects slidably with said longitudinally extending wire, said vehicle provided with electric propulsive means, and a trailing electric wire in contact with a body of water.

23. In means for electrically propelling aerial vehicles over a body of water, a plurality of floats provided with a trolley wire, an aerial vehicle provided with an electric propulsive means, electric current contacting means, and electrical connections between some or all of said floats and an electric submarine wire, and an electric wire trailing in a body of water.

24. In means for electrically propelling marine vessels, a plurality of floats provided with a trolley wire, a marine vessel provided with electric propulsive means, electric current contacting means, and electrical connections between some or all of said floats and an electric submarine wire.

25. A plurality of floats provided with means for supporting a longitudinally extending electric wire, said wire laid loosely or slidably movable upon said supporting means, and means limiting or checking longitudinally the slide or movement of said wire upon said supporting means.

26. Means for electrically propelling aerial vehicles, comprising means for supporting a longitudinally extending trolley wire, an aerial vehicle provided with electric propulsive means, a plurality of floats in a body of water, a trolley or current contacting device on the top of said aerial vehicle, and an electric wire trailed by said aerial vehicle and said wire dragged in said body of water.

27. In means for supplying electricity to aerial vehicles, a trolley wire, one or more wire suspending means disposed between the supporting points or ends of said wire, and said wire secured to and suspended by said wire suspending means.

28. In means for supplying electricity to aerial vehicles, a plurality of floats provided with a trolley wire, an aerial vehicle provided with electric current contacting means, and electrical connections between one or more of said floats and an electric cable.

29. In means for electrically propelling aerial vehicles, means for supporting a trolley wire, an aerial vehicle provided with an electric motor, arms extending outwardly or laterally from said aerial vehicle, an electric wire extending from one of said arms and connecting with a trolley in contact with said trolley wire, and a second electric wire extending from the other of said arms and trailing in a body of water.

30. In means for supplying electricity to aerial vehicles, a trolley wire, and a trolley provided with a trolley harp, a frame, and one or more gas containers.

31. In means for supplying electricity to aerial vehicles, a trolley wire, a trolley, and one or more gas containers and aeroplane supporting surfaces secured to said trolley.

32. In means for supplying electricity to marine vessels, a trolley wire, a trolley, and one or more gas containers secured to said trolley.

33. In means for supplying electricity to aerial vehicles, a trolley wire, a trolley, and one or more gas containers secured to said trolley.

34. In means for supplying electricity to aerial vehicles, a trolley wire, electric current contacting means provided with one or more gas containers, and means connecting said contacting means with an aerial vehicle.

35. In means for supplying electricity to marine vessels, a trolley wire, a marine vessel having an arm hinged to its mast, the upper end of said arm provided with a current contacting device or trolley, and said arm provided with means for holding the same in an upwardly extended position.

36. In means for supplying electricity to aerial vehicles, a trolley wire, electric current contacting means provided with one or more gas containers, means connecting said contacting means with an aerial vehicle, and a trailing wire extending from and towed by said aerial vehicle.

37. In means for supplying electricity to aerial vehicles, a trolley wire, electric current contacting means provided with one or more gas containers, means connecting said contacting means with an aerial vehicle, a trailing wire extending from and towed by said aerial vehicle, and the end of said trailing wire trailing in a body of water.

38. In means for supplying electricity to aerial vehicles, a trolley wire, and electric current contacting means provided with one or more aeroplane supporting surfaces.

39. In means for electrically communicating with aerial vehicles, a trolley wire, and electric current contacting means provided with one or more aeroplane supporting surfaces.

40. In means for supplying electricity to aerial vehicles, a trolley wire, electric current contacting means provided with one or more aeroplane supporting surfaces, and means connecting said contacting means with an aerial vehicle.

41. In means for supplying electricity to aerial vehicles, means for supporting a trolley wire, electric contacting means, an aerial vehicle provided with electric propulsive means, and an electrical ground connection between said aerial vehicle and a body of water.

42. In means for supplying electricity to aerial vehicles, means for supporting a trolley wire, electric contacting means, an aerial vehicle provided with electric propulsive means, and an electric wire extending from said aerial vehicle and trailing in a body of water.

43. A plurality of floats, said floats provided with a longitudinally extending wire, and said wire provided with a plurality of wire suspending means disposed intermediate said floats.

44. A plurality of floats arranged in a longitudinally extending line, said floats provided with a longitudinally extending wire, and said wire provided with a plurality of aerial sustained wire suspending means.

45. In means for supplying electricity to marine vessels, a plurality of longitudinally arranged lines of floats, said floats provided with longitudinally extending electric wires, and diagonally disposed flexible means connecting said floats with one another.

46. In means for supplying electricity to marine vessels, a trolley wire, and current contacting means provided with one or more aeroplane supporting surfaces.

47. In means for supplying marine vessels with electricity, a plurality of floats, said floats provided with means for supporting a trolley wire, a marine vessel provided with electric current contacting means, and said contacting means provided with one or more gas containers.

48. In means for supplying electricity to marine vessels, a plurality of floats provided with a trolley wire, a marine vessel provided with electric current contacting means, and said vessel and contacting means connected by means of an electric following member provided with a gas container.

49. In means for supplying electricity to marine vessels, a plurality of floats provided with a trolley wire, a marine vessel provided with electric current contacting means, and extended electrical connections between one or more of said floats and an electric submarine cable.

50. In means for supplying electricity to marine vessels, a trolley wire, electric current contacting means provided with one or more gas containers, and means connecting said contacting means with a marine vessel.

51. In means for electrically communicating with marine vessels, a trolley wire, and electric current contacting means provided with one or more aeroplane supporting surfaces.

52. In means for supplying electricity to marine vessels, a trolley wire, electric current contacting means provided with one or more aeroplane supporting surfaces, and means connecting said contacting means with a marine vessel.

53. In means for supplying marine vessels with electricity, a plurality of floats on a body of water, supporting means for a longitudinally extending wire, said wire laid loosely upon said supporting means, a marine vessel provided with a trailing electric wire which connects slidably with said longitudinally extending wire, said vessel provided with electric propulsive means, and electrical grounding means between said vessel and a body of water.

54. In means for supplying electricity to marine vessels, the combination of means for supporting a trolley wire, electric contacting means, a marine vessel provided with electric propulsive means, and electrical grounding means between said vessel and a body of water.

55. In means for supplying an aerial vehicle with electricity, a plurality of floats supporting a longitudinally extending electric wire, and said aerial vehicle provided with current contacting means and an electric wire trailing in a body of water.

56. In means for supplying an aerial vehicle with electricity, a plurality of floats supporting a longitudinally extending electric wire, and a ring for slidably securing said wire.

57. In means for supplying a marine vessel with electricity, a plurality of floats supporting a longitudinally extending electric wire, and a ring for slidably securing said wire.

58. In means for supplying aerial vehicles with electricity, a plurality of floats supporting a longitudinally extending electric wire, slidable securing means for said wire, and said wire provided with means for checking the longitudinal movement of said wire.

59. In means for supplying marine vessels with electricity, a plurality of floats supporting a longitudinally extending electric wire, slidable securing means for said wire, and said wire provided with means for checking the longitudinal movement of said wire.

60. In combination, a plurality of floats, a longitudinally extending electric wire, an aerial vehicle in electrical contact with said wire, an electrical source connecting with said wire, and a trailing electric wire extending from said vehicle and making electrical contact with a body of water.

61. In combination, a plurality of floats, a longitudinally extending electric wire, an aerial vehicle in electrical contact with said wire, an electrical transformer on said floats and connecting with said wire, and a trailing electric wire extending from said vehicle and making electrical contact with a body of water.

62. In combination, a plurality of floats, a longitudinally extending electric wire, a marine vessel in electrical contact with said wire, an electrical transformer on said floats and connecting with said wire, and electrical grounding means between said vessel and a body of water.

63. In combination, a plurality of floats, a longitudinally extending electric wire, an aerial vehicle in electrical contact with said wire, a trailing electric wire extending from said vehicle and making electrical contact with a body of water, and a return or negative electric wire or cable disposed in said body of water.

64. In combination, a plurality of floats, longitudinally extending positive and negative electric wires, an aerial vehicle, and current contacting means provided with one or more gas containers connecting said vehicle with said wires.

65. In combination, a plurality of floats, longitudinally extending positive and negative electric wires, an aerial vehicle, and current contacting means provided with one or more aeroplane supporting surfaces.

66. In combination, a plurality of floats, longitudinally extending positive and negative electric wires, a marine vessel, and current contacting means provided with one or more gas containers connecting said vessel with said wires.

67. In combination, a plurality of floats, longitudinally extending positive and negative electric wires, a marine vessel, and current contacting means provided with one or more aeroplane supporting surfaces.

68. In means for supplying electricity to aerial vehicles, a plurality of floats arranged in a substantially longitudinal line, said floats supporting a longitudinally extending electric wire, lateral longitudinally extending flexible means connecting said floats with one another, and said flexible means provided with buoyant means.

69. In means for supplying electricity to aerial vehicles, a plurality of floats arranged in a substantially longitudinally extending line, said floats provided with substantially horizontal brackets or frames extending outwardly from said floats and supporting a longitudinally extending electric wire, an aerial vehicle provided with current contacting means in contact with said wire, and an electric wire trailing from said vehicle and in contact with a body of water.

70. In means for supplying electricity to marine vessels, the combination of a plurality of floats arranged in a substantially longitudinally extending line, said floats provided with substantially horizontal brackets or frames extending outwardly from said floats and supporting a longitudinally extending electric wire, a marine vessel provided with current contacting means in contact with said wire, and said vessel provided with electrical grounding means in contact with a body of water.

71. In means for supplying electricity to aerial vehicles, a plurality of floats supporting an electric wire, an aerial vehicle provided with current contacting means and a trailing electric wire in contact with a body of water, and said floats provided with a depressed portion submerged below the surface of said body of water.

72. In means for supplying electricity to marine vessels, a plurality of floats supporting an electric wire, a marine vessel provided with current contacting means and electrical grounding means in contact with a body of water, and said floats provided with a depressed portion submerged below the surface of said body of water.

73. In means for supplying electricity to aerial vehicles, a plurality of floats arranged in plural substantially longitudinal lines, said floats supporting one or more longitudinally extended electric wires, an aerial vehicle provided with current contacting means, and said lines of floats connected laterally by transverse members or frames submerged below the surface of a body of water.

74. In means for supplying electricity to marine vessels, a plurality of floats arranged in plural substantially longitudinal lines, said floats supporting one or more longitudinally extended electric wires, a marine vessel provided with current contacting means, and said lines of floats connected laterally by transverse members or frames submerged below the surface of a body of water.

75. In means for supplying aerial vehicles with electricity, a plurality of floats arranged in a substantially longitudinal line and supporting an electric wire, an aerial vehicle provided with current contacting means in contact with said wire, an electric following member connecting said vehicle with said contacting means, and an electric wire trailing from said vehicle and in contact with a body of water.

76. In means for supplying marine vessels with electricity, the combination of a plurality of floats arranged in a substantially longitudinal line and supporting an electric wire, a marine vessel provided with current contacting means in contact with said wire, an electric following member connecting said vessel with said contacting means, and electrical grounding means in contact with a body of water.

77. In combination, a plurality of floats adapted to support a substantially longitudinal electric wire, an aerial vehicle provided with an electric transformer, current contacting means connecting said vehicle with said wire, and an electric wire trailing from said vehicle and in contact with a body of water.

78. In means for supplying electricity to aerial vehicles, the combination of a plurality of floats adapted to support a longitudinally extending electric wire, an aerial vehicle provided with means for making electrical contact with said wire, said vehicle provided with electric wire communication means, and an electric wire trailing from said vehicle and in contact with a body of water.

79. In means for supplying electricity to marine vessels, the combination of a plurality of floats adapted to support a longitudinally extending electric wire, a marine vessel provided with means for making electrical contact with said wire, said vessel provided with electric wire communication means, and electrical grounding means electrically connecting said vessel with a body of water.

80. In means for supplying electricity to aerial vehicles, the combination of a plurality of floats adapted to support a longitudinally extending electric wire, an aerial vehicle provided with means for making electrical contact with said wire, said vehicle provided with a wire telegraph instrument, and an electric wire trailing from said vehicle and in contact with a body of water.

81. In means for supplying electricity to marine vessels, the combination of a plurality of floats adapted to support a longitudinally extending electric wire, a marine vessel provided with means for making electrical contact with said wire, said vessel provided with a wire telegraph instrument, and electric grounding means in contact with a body of water.

82. In means for supplying electricity to aerial vehicles, a mast having a horizontal arm, a trolley wire laid loosely over said arm, an aerial vehicle, an electric wire trailing from said vehicle and making contact with said trolley wire, and a second electric wire trailing from said vehicle and making contact with a body of water.

83. In means for supplying aerial vehicles with electricity, a plurality of floats adapted to support a longitudinally extending electric wire, an aerial vehicle provided with a trailing electric wire in contact with a body of water, and current contacting means entirely encircling said electric wire.

84. In means for supplying aerial vehicles with electricity, means for supporting a trolley wire, means for slidably securing said trolley wire, said securing means being open at the top thereof, an aerial vehicle provided with a trailing electric wire connected to current contacting means, said contacting means making contact with said trolley wire, and a second electric wire trailing from said vehicle and making contact with a body of water.

85. In means for supplying electricity to aerial vehicles, a plurality of floats, a longitudinally extending electric wire, an aerial vehicle, a plurality of wire suspending means, said floats and wire suspending means supporting said wire, and contacting means connecting said vehicle and wire.

86. In means for supplying electricity to marine vessels, a plurality of floats, a longitudinally extending electric wire, a marine vessel, a plurality of wire suspending means, said floats and wire suspending means supporting said wire, and contacting means connecting said vessel and wire.

87. In means for supplying electricity to aerial vehicles, a plurality of floats, a longitudinally extending electric wire, an aerial vehicle, a plurality of balloons, said floats and balloons supporting said wire, and contacting means connecting said vehicle and wire.

88. In means for supplying electricity to marine vessels, a plurality of floats, a longitudinally extending electric wire, a marine vessel, a plurality of balloons, said floats and balloons supporting said wire, and contacting means connecting said vessel and wire.

89. In combination, a plurality of floats supporting a longitudinally extending electric wire, an aerial vehicle provided with electric contacting means and a trailing electric wire in contact with a body of water, and said floats provided with anchoring means.

90. In combination, a plurality of floats supporting a longitudinally extending electric wire, an aerial vehicle provided with electric contacting means and a trailing electric wire in contact with a body of water, said floats provided with anchoring means, and said anchoring means provided with buoyant means.

91. In combination, a plurality of floats supporting a longitudinally extending electric wire, a marine vessel provided with electric contacting means and electric grounding means in contact with a body of water, said floats provided with anchoring means, and said anchoring means provided with buoyant means.

92. In means for supplying electricity to aerial vehicles, means for supporting a trolley wire, an aerial vehicle provided with electric current contacting means, and an electric wire trailing from said vehicle and in contact with a body of water.

93. In a plurality of substantially longitudinally extending lines of floats, means for supporting transverse supports adapted to support a longitudinally extending wire, and said supports each provided with means for preventing same from breaking under strains.

94. In means for supplying electricity to aerial vehicles, a plurality of floats provided with means for supporting transverse supports adapted to support positive and negative longitudinally extending trolley wires, an aerial vehicle provided with trailing positive and negative electric wires provided with electric current contacting means, and said trailing positive and negative electric wires being insulated.

95. In means for supplying electricity to aerial vehicles, a plurality of floats supporting a trolley wire, an aerial vehicle in electrical contact with said trolley wire and provided with an electric wire trailing in a body of water, a bare submarine electric cable adapted to receive electric current from said trailing wire through said water, and said submarine cable connected to an electrical source.

96. In means for supplying electricity to marine vessels, a plurality of floats supporting a trolley wire, a marine vessel in electrical contact with said trolley wire, said vessel provided with electric grounding means in contact with a body of water, a bare submarine cable adapted to receive electric current from said grounding means through said water, and said submarine cable connected to an electrical source.

97. In means for supplying electricity to aerial vehicles, a plurality of floats supporting a trolley wire, an aerial vehicle in electrical contact with said trolley wire and provided with an electric wire trailing in a body of water, a submarine electric cable, a bare electric wire connecting with said cable and adapted to receive electric current from said trailing wire through said water, and said submarine cable connected to an electrical source.

98. In means for supplying electricity to marine vessels, a plurality of floats supporting a trolley wire, a marine vessel in electrical contact with said trolley wire, said vessel provided with electric grounding means in contact with a body of water, a submarine cable, a bare electric wire connecting with said cable and adapted to receive electric current from said grounding means through said water, and said submarine cable connected to an electrical source.

CHARLES W. WALLER.